US012160427B2

(12) United States Patent
Ibryam

(10) Patent No.: US 12,160,427 B2
(45) Date of Patent: Dec. 3, 2024

(54) MANAGING ACCESS LEVEL PERMISSIONS BY A DISTRIBUTED LEDGER NETWORK

(71) Applicant: RED HAT, INC., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 245 days.

(21) Appl. No.: 17/936,359

(22) Filed: Sep. 28, 2022

(65) Prior Publication Data
US 2024/0106830 A1 Mar. 28, 2024

(51) Int. Cl.
H04L 9/40 (2022.01)
(52) U.S. Cl.
CPC ........ H04L 63/105 (2013.01); H04L 63/0853 (2013.01); H04L 63/101 (2013.01)
(58) Field of Classification Search
CPC .. H04L 63/105; H04L 63/0853; H04L 63/101
See application file for complete search history.

(56) References Cited

U.S. PATENT DOCUMENTS

| 11,019,059 | B2 | 5/2021 | Lelcuk et al. | |
| 2011/0283111 | A1* | 11/2011 | Bister | H04L 9/3213 713/185 |
| 2017/0220792 | A1* | 8/2017 | Rea | H04L 63/105 |
| 2019/0294817 | A1 | 9/2019 | Hennebert et al. | |
| 2020/0118086 | A1 | 4/2020 | Achkir | |
| 2020/0344233 | A1 | 4/2020 | Lai et al. | |
| 2020/0272755 | A1 | 8/2020 | Soundararajan et al. | |
| 2021/0126777 | A1 | 5/2021 | Mash | |
| 2021/0391992 | A1 | 12/2021 | Schiffman et al. | |
| 2023/0214792 | A1* | 7/2023 | Lee | G06Q 20/02 705/75 |

OTHER PUBLICATIONS

Asma Khatoon, "A Blockchain-Based Smart Contract System for Healthcare Management", https://www.researchgate.net/publication/338380336_A_Blockchain-Based_Smart_Contract_System_for_Healthcare_Management, Jan. 2020, pp. 1-24, Department of Electrical & Electronic Engineering, National University of Ireland, Ireland.

* cited by examiner

Primary Examiner — Amie C. Lin
(74) Attorney, Agent, or Firm — Womble Bond Dickinson (US) LLP

(57) ABSTRACT

An access control list is identified that, for a specified data item, defines, for each of a set of access levels, one or more entities that are collectively to authorize access to the data item according to a respective access level. The access control list is translated into a sequence of instructions implementing a smart contract. The smart contract is to transmit requests to entities for authorization to allow a specified requesting entity to access the specified data item. Based on responses to the transmitted requests, the smart contract is to generate a first token that enables access to the specified data item according to a first level of access or a second token that enables access to the specified data item according to a second level of access. The sequence of instructions is transmitted to one or more nodes of a distributed ledger network.

20 Claims, 6 Drawing Sheets

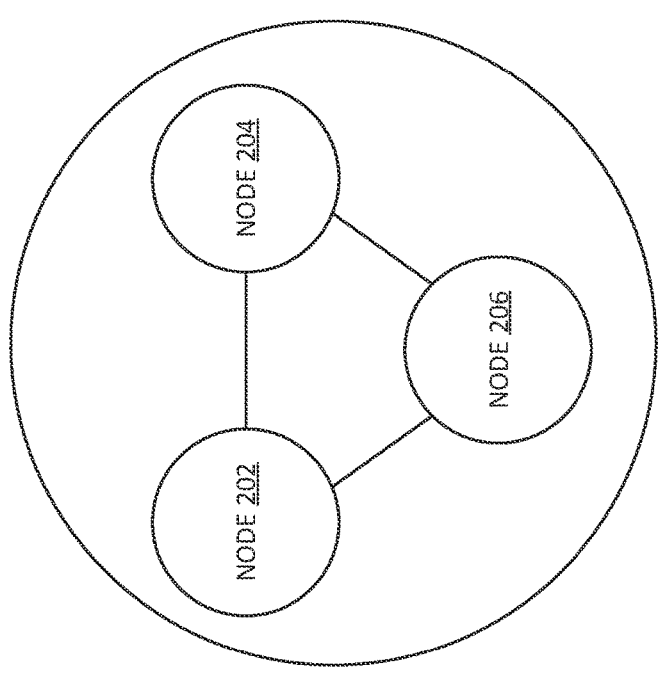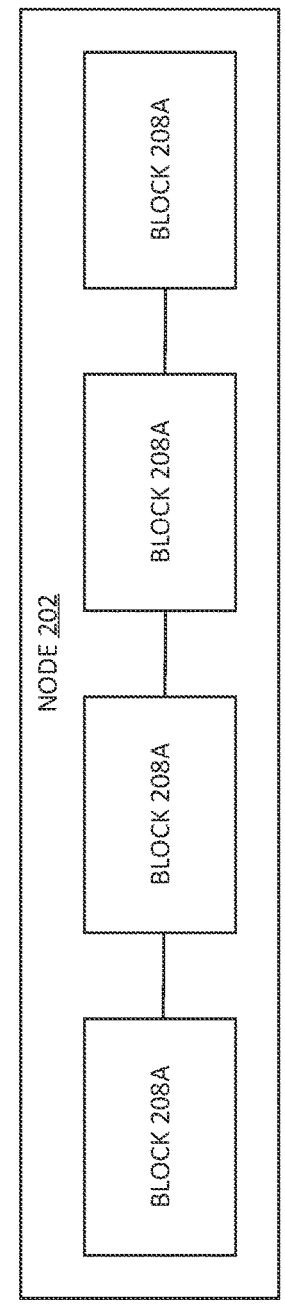
FIG. 2

300

Identify an access control list that, for a specified data item, defines, for each of a set of access levels, one or more entities that are to collectively authorize access to the data according to a respective access level 310

Translate the access permission protocol into a sequence of instructions implementing a smart contract 312

Provide the sequence of instructions to one or more nodes of a distributed ledger network 314

Receive a token associated with accessing the data according to a particular access level in view of a set of users that has provided authorization for a user to access the data 316

Provide the token to the user device to enable the user to access the data according to the particular access level 318

FIG. 3

MANAGING ACCESS LEVEL PERMISSIONS BY A DISTRIBUTED LEDGER NETWORK

TECHNICAL FIELD

Embodiments of the present disclosure relate to computing systems, and more specifically, relate to managing access level permissions by a distributed ledger network.

BACKGROUND

Services, such as cloud-based network services, can be provided by a service provider to one or more users. In some instances, such cloud-based network services are provided as Software as a Service (SaaS) or Platform as a Service (PaaS). In a SaaS model, for example, software applications (e.g., of a respective user) can be hosted on resources that are provided and managed by a service provider. Representatives of the service provider (e.g., operators, engineers, etc.) may be permitted to access data for a software application hosted on the provided resources according to a role-based access control policy, where a user device of each representative is associated with a particular level of access to user data (e.g., no access, read-only access, write and read access, etc.) according to a particular role associated with the user device. In some instances, a representative may need to access data at a higher level of access than is permitted according to the role of the associated user device (e.g., to address problems that arise with respect to the provided services, to provide government agencies with access to system or application data, etc.).

BRIEF DESCRIPTION OF THE DRAWINGS

The disclosure is illustrated by way of example, and not by way of limitation, and can be more fully understood with references to the following detailed description when considered in connection with the figures, in which:

FIG. 2 illustrates an example distributed ledger, in accordance with embodiments of the present disclosure.

FIG. 3 is a flow diagram illustrating an example method for managing access level permissions by a distributed ledger network, in accordance with embodiments of the present disclosure.

DETAILED DESCRIPTION

Figure 1:
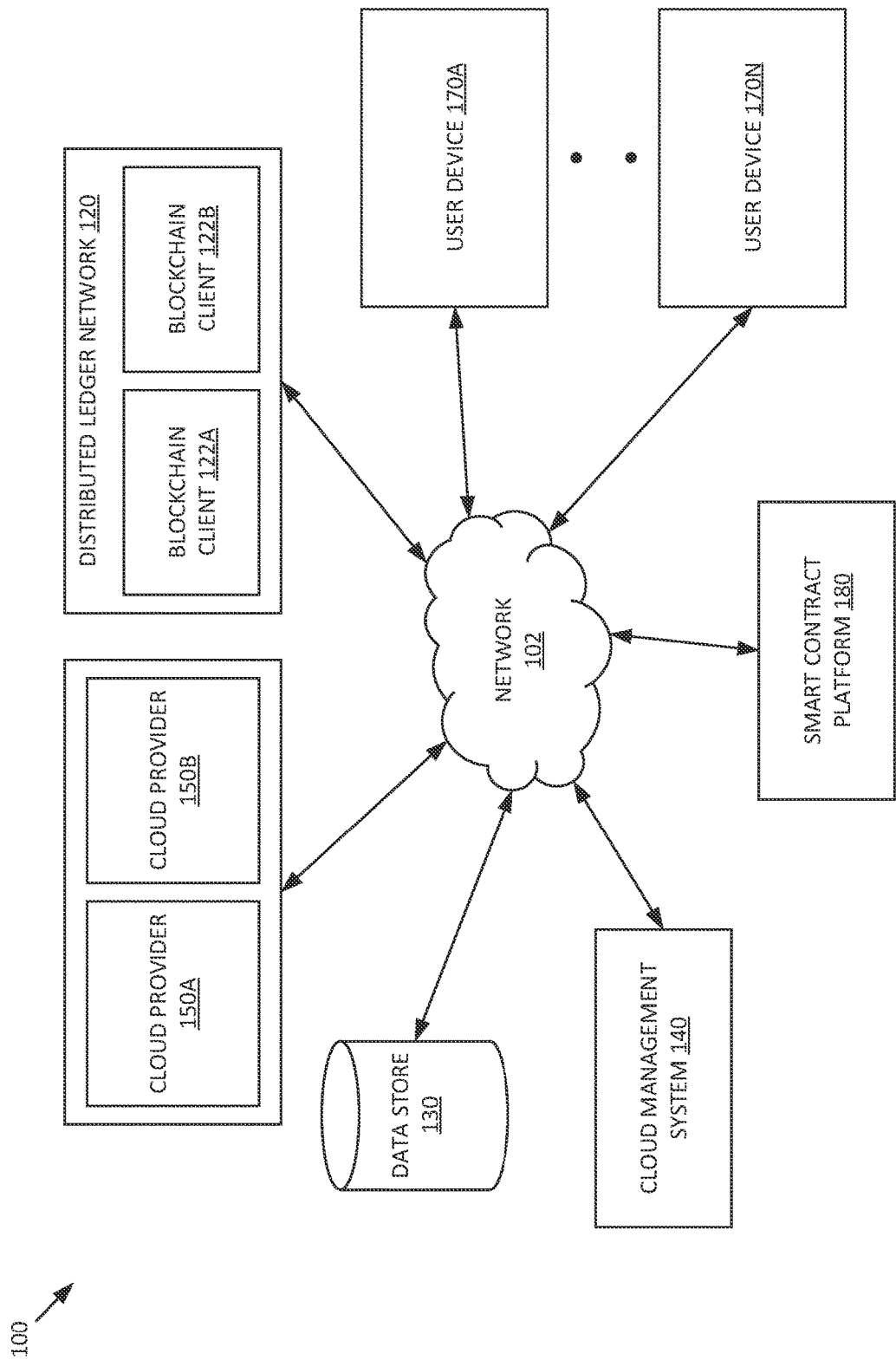
FIG. 1 illustrates a high-level component diagram of an example architecture, in accordance with one or more aspects of the present disclosure.

Described herein are methods and systems for managing access level permissions by a distributed ledger network. A service provider can provide services and/or resources, such as cloud-based network resources) to one or more users of a cloud-based system. For example, in a System as a Software (SaaS) model and/or a Platform as a Software (PaaS) model, a service provider can provide and manage such cloud-based network resources and/or services (referred to herein simply as "resources" or "provided resources") to user devices associated with one or more users. Software applications (e.g., of a respective user) can be hosted on the provided resources. Data associated with the software applications is referred to as application data or user data herein.

Representatives of a service provider (e.g., operators, engineers, system administrators, account managers, sales consultants, etc.) may or may not be permitted to access application data according to a data access control policy (e.g., defined by the service provider and/or a respective user). In some instances, different representatives may be permitted to access application data and/or different types of application data according to different data access levels. For example, a data access control policy can be a role-based access control policy that defines a particular level of access (e.g., no access, read-only access, write and read access, etc.) and/or a type of data that can be accessed by a user device of a service provider representative based on a role (e.g., operator role, engineer role, system administrator role, account manager role, sales consultant role, etc.) associated with the user device. In an illustrative example, a user device associated with a sales consultant role may have a lower level of access (e.g., no access, etc.) than a user device associated with a system administrator role (e.g., which may be associated with read-only access, write and read access, etc.), according to the role-based access control policy. In another illustrative example, a user device with a system administrator role may be able to access application data associated with running the software application on the provided resources (e.g., performance metric data, etc.), but may not access application data that is particular or sensitive to respective user.

In some instances, a representative may need to access application data according to a higher level of data access than is permitted according to a role associated with a user device of the representative. For example, a problem may arise with one or more of the provided resources, which may not be adequately addressed unless the representative accesses particular portions of the application data that the representative may not currently have access to (e.g., based on the role of the user device for the representative). In another example, a government agency may require that the service provider provide the agency with access to the application data (e.g., in accordance with a subpoena, etc.). The representative may request (e.g., via a user device of the representative) to access the data according to the higher access level for a particular period of time (e.g., a period of time sufficient to address the problem with the provided resources, a period of time sufficient to provide the government agency with access to the application data, etc.). The data access policy can define one or more stakeholders that are to provide authorization for the representative to access the application data according to the requested level of access and/or for the amount of time that the representative is permitted to access the application data (e.g., based on the circumstances of the request.). The one or more stakeholders can include additional representatives of the service provider, representatives of the user associated with the application hosted by the provided resources, representatives of a support organization (e.g., a subcontracted organization, etc.), and so forth.

In conventional systems, one or more computing resources of the service provider may transmit the request for the higher access level to user devices associated with each stakeholder defined by the data access policy. Each stakeholder can provide authorization for the higher access level (e.g., using the respective user device), which is transmitted to the one or more computing resources of the service provider. Once the authorization is received from each stakeholder, the computing resources of the service provider can provide a token to that allows a user device associated with the representative with temporary access to the application data according to the higher access level for a particular time period. The user device of the representative can provide the token to the computing resources to access the application data. Once the particular time period is expired, the computing resources of the service provider can restrict the user device of the representative from accessing the application data according to the higher access level. After the higher access level is restricted, the user device of the representative may access the application data according to the access level associated with the role of the user device, as provided by the data access policy. If the representative needs more time to access the application data than is permitted by the data access policy, the representative requests additional time to access the data according to the higher access level. An additional request is sent to the stakeholders to provide authorization for the additional time, as described above.

It can take a significant amount of time (e.g., minutes, hours, days, etc.) for the service provider to obtain authorization from each stakeholder to provide the representative with access to the application data according to the requested access level. As the service provider waits to receive authorization from each stakeholder, one or more resources and/or services may not be available to run the application of the user. In some instances, the service provider may temporarily run the application on other computing resources that are typically allocated to other users or processes, making those computing resources unavailable to those users or processes. Additionally or alternatively, the service provider may not have additional computing resources to support the user application, and accordingly execution of the user application may halted until authorization is received from each stakeholder. In addition, the data access policy can provide a significant number of stakeholders are to provide authorization. Providing, receiving and tracking authorization from each stakeholder can consume a significant amount of computing resources (e.g., memory, processing cycles, etc.) of the stakeholders and/or the service provider, which makes those resources unavailable for other processes. Accordingly, an overall efficiency of the system decreases and an overall latency of the system increases.

Finally, according to conventional techniques, a higher level of access authorized to a representative is automatically revoked at the end of the time period defined by the data access policy. In some instances, a representative can continue to have access to application data according to the higher access level for the entire time period even if the problem that prompted the request for the higher access level is resolved is a shorter amount of time than defined the time period, thus exposing the application data to attacks by malicious actors. In other instances, the representative may not resolve the problem that prompted the request within the time period defined by the data access policy. Accordingly, the service provider sends additional requests to the stakeholders to obtain authorization to extend permission for the representative to access the data according to the higher access level in order to address the problem. In some instances, multiple additional requests can be sent to the stakeholders (e.g., to extend the authorization for multiple additional time periods), which consumes even further computing resources of the service provider and the stakeholders, thereby further decreasing the overall system efficiency and further increasing overall system latency.

Implementations of this disclosure address the above-mentioned and other deficiencies by providing techniques for managing access level permissions by a distributed ledger network. A service provider can provide services and/or resources (e.g., cloud-based network services) that are used to host software applications of one or more users of the services and/or resources (also referred to as "customers" herein). A data access policy (e.g., a role based access control policy) between the service provider and a respective customer can define levels of access to data associated with the software applications (referred to as application data or user data herein) for representatives of the service provider (e.g., operators, engineers, system administrators, account managers, sales consultants, etc.). The policy can provide, for example, that a user device of a respective representative can be associated with a particular role (e.g., an operator role, an engineer role, a system administrator role, etc.) and each role can be associated with a particular level of access to the application data. A level of access refers to a type of access that a user device has to application data (e.g., no access, read-only access, read and write access, etc.) and/or a type of application data that the user device is permitted to access (e.g., performance metric data, privileged data, etc.).

An access permission protocol (e.g., between the service provider and the respective user) can provide details regarding advanced levels of data access that can be provided to user devices of respective representatives during exceptional circumstances (e.g., when errors occur with respect to one or more services or resources of the service provider, when access to data is requested by a government entity or other authority, etc.). Such protocol is also referred to as a "break-glass protocol." The access permission protocol can be provided to a computing system as an access control list (e.g., by a user device associated with the service provider and/or the respective user). The access permission protocol can provide an indication of one or more circumstances that warrant advanced levels of data access for representatives of a service provider, one or more of a maximum level of access that can be provided to a user device associated with a particular role, a set of users (e.g., representatives of the service provider, representatives of the user, representatives of a third party, such as a subcontracted entity, etc.) that are to provide authorization for the user device to access data according to the advanced access level, a length of time to provide the user device with the advanced access level in view of the circumstances, a maximum number and/or conditions associated with time extensions that can be granted with respect to the advanced access level, and so forth. The set of users that are to provide authorization for the user device to access data according to an advanced access level are also referred to herein as stakeholders.

A smart contract platform can translate terms of an access permission protocol into a sequence of instructions implementing a smart contract. A smart contract refers to one or more programs that are stored on a distributed ledger network (e.g., a blockchain) and are executed (e.g., by one or more nodes of the distributed ledger network) when one or more conditions are met. A smart contract platform refers to an environment in which software is executed to facilitate execution a smart contract. In some instances the smart contract platform can include remote computing resources that can execute the one or more programs of the smart contract. The smart contract platform can transmit the sequence of instructions to one or more nodes of a distributed ledger network (e.g., a blockchain network) and the one or more nodes can store the sequence of instructions at one or more blocks of the node (or blocks of another node of the distributed ledger network). The sequence of instructions can cause one or more nodes of the distributed ledger network to provide a user device (e.g., associated with a representative of the service provider) with a token (e.g., a cryptographic key, a password, etc.) that enables the user device to access data of an application hosted by resources of the service provider in accordance with a requested access level (e.g., in view of conditions of the access permission protocol), as described in further detail herein.

In some embodiments, one or more representatives of the service provider can request that a user device associated with a lower level of access be provided with access to application data according to a higher level of access. The representative(s) can transmit the request in response to a detection of one or more of the exceptional circumstances defined by the access permission protocol. For example, the representative(s) can transmit the request in response to detecting that one or more components of the software application are encountering errors while running on the resources provided by the service provider. In some embodiments, the request can be transmitted by the user device to which the higher level of access is to be provided. In other or similar embodiments, the request can be transmitted by a user device associated with another representative of the service provider and/or another component associated with the service provider. For purposes of illustration and explanation only, the device that is to be provided with the higher level of access to the application data is referred to herein as a requesting user device, although it should be noted that such user device may not provide the request, as indicated above.

The request can be received by the smart contract platform and/or one or more nodes of the distributed ledger network, in some embodiments. In response to the request, the one or more nodes of the distributed ledger network can execute the sequence of instructions corresponding to the smart contract to generate a token that enables the user device to access the application data in accordance with the requested access level. In some embodiments, each node can identify one or more stakeholders that are to provide authorization for the requesting user device to access the data according to the advanced access level and can transmit a request for such authorization to user devices (referred to herein as authorizing user devices) associated with each of the stakeholders. In response to receiving the requested authorization (e.g., from each of the authorizing user devices), the node can generate a token that enables the requesting user device to access the application data according to the requested access level. In some embodiments, the one or more nodes can provide the generated token to the smart contract platform. The smart contract platform can transmit the generated token to the requesting user device. In other or similar embodiments, the node can transmit the generated token directly to the requesting user device. The one or more nodes (or the smart contract platform) can additionally or alternatively transmit the generated token to an authorization engine connected to one or more services or resources provided to the customer by the service provider. The requesting user device can access the data according to the higher level of access by providing the token (e.g., received from the nodes and/or the smart platform) to the authorization engine. The authorization engine can determine whether the token provided by the requesting user device matches or otherwise corresponds to the token received from the one or more nodes of the distributed ledger network and/or the smart contract platform. If so, the authorization engine can enable the requesting user device to access the application data according to the higher level of access.

In some embodiments, the sequence of instructions corresponding to the smart contract can cause the one or more nodes of the distributed ledger network to generate a first token to enable the requesting user device to access the application data according to the requested access level if authorization is received by each of the stakeholders associated with the requested access level (e.g., as provided by the access permission protocol.). In additional or alternative embodiments, the sequence of instructions can cause the one or more nodes to generate a second token to enable the requesting user device to access the application data according to an access level that is lesser than the requested access level if authorization is received by a subset of stakeholders associated with the requested access level. In an illustrative example, the requested access level can be a write and read access level (e.g., enabling the requesting user device to access and/or edit the application data). If authorization is received by only a subset of stakeholders associated with the requested access level, the sequence of instructions can cause the one or more nodes to generate a token that enables the requesting user device to a read-only access level. Further details regarding generating multiple tokens are provided herein.

In some embodiments, the token can be encoded (e.g., by the one or more nodes) provide the requesting user device with access to the application data according to the higher level of access for a particular time period (e.g., in accordance with the access permission protocol). In some embodiments, responsive to decoding the token, the authorization engine can restrict the requesting user device from accessing the application data according to the higher level of access once the particular time period is completed. In other or similar embodiments, the token can be further encoded to indicate that the authorization engine can automatically extend the time period for the requesting user device to access the data (e.g., without request from the requesting user device or another entity of the system) if the circumstances that prompted the request are still present. In yet other or similar embodiments, the token can be encoded to indicate that the requesting user device is to be provided with access to the application data according to the higher level of access until the circumstances that prompted the request are not present. Further details regarding authorization engine providing the requesting user device with access to the application data are provided herein.

Aspects of the present disclosure address the above and other deficiencies by providing techniques to provide requesting user devices with access to application data according to a requested access level based on the number of stakeholders that provide authorization for the access and/or for a time period that appropriately reflects the circumstances prompting the request for access. The smart contract platform can translate the access permission protocol into a sequence of instructions that causes the nodes of the distributed platform to automatically (e.g., without user interaction) collect authorization from relevant stakeholders and generate and provide a token that enables a user device to access application data when exceptional circumstances are detected (e.g., in accordance with the access permission protocol and/or a break-glass policy). As the nodes of the distributed ledger network generate and provide the token to the requesting user device automatically, computing resources of the service provider and other entities of the system are not consumed to request, provide, and/or track access level authorization, thus making those resources available for other processes. Accordingly, an overall efficiency of the system is increased and an overall latency of the system is decreased.

In addition, if authorization is not provided (e.g., or is not promptly provided) by each stakeholder associated with a requested access level (e.g., a write and read level of access), the one or more nodes can generate a token to enable a requesting user device to access the application data according to a reduced level of access (e.g., a read-only access). Accordingly, a representative of the service provider (e.g., associated with the requesting user device) can access at least a portion of the application data in order to begin addressing the problem that prompted the request for the advanced access level before complete authorization (e.g., from all stakeholders) is provided. This enables the representative to address the problem more quickly, which reduces the amount of time and computing resources consumed to address the problem, and improves the overall system latency and efficiency. Finally, as nodes of the distributed ledger network can encode the tokens to cause an authorization engine to extend access to the requesting user device and/or terminate access once the problem is addressed, the requesting user device is provided with access to the application data according to the higher authorization level for an appropriate amount of time to address the problem, which reduces the risk of attack by malicious actors, and makes more computing resources available to various entities of the system, thus improving an overall system efficiency and latency, as described above.

FIG. 1 illustrates a high-level component diagram of an example system architecture 100, in accordance with one or more aspects of the present disclosure. In some embodiments, system architecture 100 can be used in a containerized computing service platform, such as a Platform-as-a-Service (PaaS) system (e.g., OpenShift®). The PaaS system can provide resources and services (e.g., microservices) for the development and execution of applications owned or managed by multiple users. The PaaS system provides a platform and environment that enables users to build applications and services in clustered computing environment (e.g., a cloud computing environment). Although implementations of the present disclosure are described in accordance with a particular type of system, this should not be considered as limiting the scope or usefulness of the features of this disclosure. For example, the features and techniques described herein can be used with other types of multi-tenant systems and/or other containerized computing service platforms.

As shown in FIG. 1, service architecture 100 includes a distributed ledger network 120 coupled to user devices 170 (e.g., user device 170A, user device 170B, etc.), a cloud management system 140, one or more cloud providers (e.g., cloud provider 150A, cloud provider 150B, etc.), data store 130, and/or a smart contract platform 180 via a network 102. Network 102 can include a private network (e.g., a local area network (LAN), a wide area network (WAN), intranet, or other similar private networks) or a public network (e.g., the Internet), in some embodiments. Distributed ledger network 120 can include one or more block chain clients 122 (e.g., block chain client 122A, blockchain client 122B, etc.) across one or more machines, such as server computers, desktop computers, or any other type of computing device. Each blockchain client 122 can store data (e.g., availability data) locally in each blockchain client's local storage. Each blockchain client 122 can be or otherwise correspond to a node of distributed ledger network 120. Further details regarding distributed ledger network 120 are provided with respect to FIG. 2.

User device(s) 170 can include a personal computer (PC), a laptop, a mobile phone, a tablet computer, or any other computing device. Each user device 170 can run an operating system (OS) that manages hardware and/or software of the user device 170. An application or a daemon (not shown) can run on user device 170 (e.g., via the OS of each user device 170. Cloud provider 150 can be configured to provide cloud-based network services and/or resources to users, in some embodiments. In some embodiments, cloud provider 150 and a user can enter into a service level agreement (SLA), which defines a type and/or amount of one or more cloud-based network services and/or resources to be provided by one or more cloud providers 150 (e.g., cloud provider 150A, cloud provider 150B, etc.) to a user device 170 (e.g., an endpoint device) associated with the user. Cloud-based network services and/or resources can include computing service uptime (e.g., server uptime), persistent storage, software application instantiation, network performance, cloud storage, support response time, etc. In some embodiments, user device 170 can access the contracted services provided by cloud provider 150 via network 102.

In some embodiments, one or more representatives of cloud provider 150 can provide support with respect to the services and/or resources provided to users. A representative of cloud provider 150 can include any entity (e.g., an individual user, a service entity, etc.) that provides support with respect to contracted services and/or resources. A representative can include, but is not limited to, an operator, an engineer, a system administrator, an account manager, a sales consultant, and so forth. Representatives of cloud provider 150 can be associated with one or more user devices 170 that are connected to cloud services and/or resources via network 102. In some embodiments, a data access policy between cloud service provider 150 and a user of contracted resources and/or services can define levels of access to data associated with software applications for representatives of the service provider. As indicated above, a level of access to application data refers to a type of access permitted by a user device 170 associated with a representative of cloud provider 150 and/or a type of application data that the user device 170 is permitted to access. A type of access can include no access (e.g., the representative is not permitted to access any application data), read-only access (e.g., the representative is permitted to read application data but not write or edit application data), write and read access (e.g., the representative is permitted to read, write, and/or edit application data), and so forth. It should be noted that although embodiments of the present disclosure maybe directed to no access, read-only access, and write and read access, embodiments of this disclosure can be applied to any type of data access. A type of data can refer to a portion of application data that can be accessed. For example, some representatives may only be permitted to access performance data or metadata associated with an application running via contracted resources and/or services, without accessing data that is sensitive or private to the user. Other representatives may be able to access other types of data. The data access policy between the cloud service provider 150 and the user can define an access level for each representative of the cloud service provider 150 in view of a role of the representative. Such data access policy is referred to herein as a role based access control policy. It should be noted that although some embodiments of the present disclosure may be directed to a role-based access control policy, the data access policy of present embodiments can include any type of access control policy.

In some embodiments, the data access policy can be associated with an access control protocol. The access control protocol can provide details regarding advanced levels of data access that can be provided to user devices 170 of respective representatives during exceptional circumstances, as described above. In some embodiments, the access permission protocol can provide one or more of an indication of one or more circumstances that warrant advanced levels of data access for representatives of cloud provider 150, a maximum level of data access to be provided to a user device 170 associated with a particular role, a set of users (e.g., stakeholders) that are to provide authorization for the user device to access data according to an advanced access level, a length of time to provide the user device 170 with the advanced access in view of the circumstances, a maximum number and/or conditions associated with time extensions that can be granted with respect to the advanced access level, and so forth.

Data store 130 can be implemented on one or more machines, such as server computers, desktop computers, or any other type of computing device. An example of data store 130 includes a persistent storage that is capable of storing data collected from various data sources including local and remote computing devices such as desktop computers, laptop computers, handheld computers, server computers, gateway computers, mobile communications devices, cell phones, smart phones, or similar computing device. In some embodiments, the data store 130 can be or otherwise include a network-attached file server, while in other embodiments the data store 130 can be or otherwise include another type of persistent storage such as an object-oriented database, a relational database, and so forth. Data store 130 can be coupled to a cloud resource provisioning component (not shown) directly or via a network (e.g., network 102 or another network). In an example, data store 130 can be a relational database management system (RDBMS) used for the storage of information for cloud providers. In an example, data store 130 can include processing logic to enable the cloud resource provisioning component to search for and retrieve data relating to cloud providers, including cloud resource parameters. In another example, data store 130 can store data associated with a data access policy and/or an access control protocol between a user and cloud provider 150, as described above.

A blockchain client 122 can include one or more components (e.g., hardware components, software components, a combination thereof, etc.) that connects to other clients 122 of distributed ledger network 120 (e.g., in a peer-to-peer manner). Each client 122 can communicate with other clients 122 of distributed ledger network 120. For example, blockchain client 122A can connect to and communicate with blockchain client 122B. One or more components of blockchain client 122A can reside or otherwise execute using different computing resources than components of blockchain client 122B. Each blockchain client 122 can include or otherwise correspond to a node of distributed ledger network 120, in some embodiments. As indicated above, each blockchain client 122 can obtain data (e.g., availability data) and can store such data in each blockchain client's local storage. Each blockchain client 122 can be configured to execute instructions (or cause another blockchain client 122) to execute instructions implementing a smart contract, in accordance with embodiments described herein.

Smart contract platform 180 can be configured to create and/or manage smart contracts. As indicated above, a smart contract refers to one or more programs that are stored on a distributed ledger network (e.g., distributed ledger network 120) and are executed when one or more conditions are met (e.g., by a blockchain client 122). Smart contract platform 180 refers to an environment in which software is executed to facilitate execution of one or more smart contracts. In some embodiments, smart contract platform 180 can include one or more computing resources (e.g., of system 100) that execute the one or more programs of the smart contract. In some embodiments, smart contract platform 180 can be configured to create and/or manage a smart contract based on an access control protocol between cloud provider 150 and a user of contracted services and/or resources. For example, smart contract platform 180 can obtain information associated with the access control protocol (e.g., via data store 130, from one or more of user devices 170, etc.) and can translate terms of the SLA into a sequence of instructions implementing a smart contract. Smart contract platform 180 can provide the translated terms of the SLA to one or more blockchain clients 122 of distributed ledger network 120. The one or more blockchain clients 122 can store the sequence of instructions in local storage of the one or more blockchain clients 122, as described above.

In some embodiments, the sequence of instructions can cause one or more blockchain clients 122 to generate one or more tokens to enable a user device 170 associated with a representative of cloud provider 150 to temporarily access application data according to an advanced level of access (e.g., in response to extraordinary circumstances). For example, in response to detecting a circumstance that warrants the advanced level of access (e.g., in accordance with the access control protocol), one or more blockchain clients 122 can receive a request to enable the user device 170 to access the application data in accordance with a particular level of access. The one or more blockchain clients 122 can execute the sequence of instructions, which can cause the one or more blockchain clients 122 to solicit authorization from a set of users (e.g., stakeholders) associated with the particular level of access. Once authorization is received from at least a subset of the set of users, the one or more blockchain clients 122 can generate a token (e.g., a cryptographic token) that enables the user device 170 to temporarily access application data according to a higher level of access than is defined by the data access policy. The one or more blockchain clients 122 can transmit the generated token to smart contract platform 180 and/or the user device 170 associated with the representative to be provided the advanced level of access. In additional or alternative embodiments, the one or more blockchain clients 122 can also provide the generated token to an authorization engine (not shown) that is connected to the contracted services and/or resources provided by cloud provider 150. The authorization engine can be managed by cloud provider 150, a user device 170 associated with a user of the contracted services and/or resources, and/or by a device associated with a third party. Further details regarding the authorization engine are described with respect to FIG. 4.

The user device 170 associated with the representative of cloud provider 150 can provide the token to the authorization engine and the authorization engine can compare the provided token to the token received from blockchain clients 122. In response to determining that the provided token matches or otherwise corresponds to the received token, authorization engine can enable the user device 170 to access the application data in accordance with the advanced level of access, as described herein. In some embodiments, the authorization engine can revoke access in accordance with the advanced access level in response to detecting that a time period associated with the access has expired and/or the circumstances that warranted the advanced access are no longer present. Further details regarding creating the smart contract, generating and providing tokens, and providing and revoking access to application data are provided herein.

In response to obtaining the availability data (e.g., from service availability monitor 172 and/or smart contract platform 180), a respective blockchain client 122 can store the availability data in local storage of the respective blockchain client 122, as described above. In some embodiments, the blockchain client 122 can store availability data for each time period of a time interval in local storage of the blockchain client 122. For example, if a time interval is defined in the SLA to be approximately one hour, blockchain client 122 can store availability data for each time period (e.g., each second, each minute, etc.) of the time interval in the local storage of the blockchain client 122. In another example, if a time interval is defined in the SLA to be approximately one month, blockchain client 122 can store availability data for each time period of the month in the local storage of the blockchain client 122. The blockchain client 122 can execute the sequence of instructions corresponding to the smart contract (e.g., at the end of the time interval), in some embodiments. In some embodiments, the blockchain client 122 can execute the sequence of instructions to provide a service credit to the user device 170 associated with the user of the contracted services, in accordance with the SLA. Further details regarding creating the smart contract, monitoring the availability of contracted services, and providing a service credit to the user of the contracted services are provided herein.

FIG. 2 illustrates an example distributed ledger network 120, in accordance with embodiments of the present disclosure. In some embodiments, distributed ledger network 120 can include one or more nodes (e.g., node 202, node 204, node 206) that maintain one or more portions of a distributed ledger. A distributed ledger 120 can be a blockchain, in some embodiments. A blockchain is a type of distributed ledger that is used, for example, in a Bitcoin crypto-currency system. The blockchain is a data structure including a complete history of each block 208 in the distributed ledger network 120 from the first block (e.g., block 208A) to the most recently added block (e.g., block 208D). Each node of the distributed ledger network 120 can maintain a copy of all or a portion of the distributed ledger in storage (e.g., on disk or in RAM) that is local to the node. For example, each node 202, 204, and/or 206 can receive a copy of the distributed ledger upon joining the network. In accordance with embodiments described herein, nodes 202, 204, and/or 206 can correspond to one or more of blockchain clients 122, as described with respect to FIG. 1. In some embodiments, distributed ledger can be a public ledger that is maintained by distinct individual computer systems each operated by different entities that maintain a single blockchain. In additional or alternative embodiments, the distributed ledger can be maintained by one or more individual computing system that are operated by a single entity (e.g., a private or a closed system).

Nodes 202, 204, and/or 206 can sequentially record data into the distributed ledger of distributed ledger network 120 as blocks of data. For example, each of nodes 202, 204, and 206 can be operated to "process" blocks 208 (e.g., blocks 208A, 208B, 208C, 208D) of the distributed ledger by validating data associated with each block 208. In some embodiments, only one node receives data that has been broadcasted over a network (e.g., by smart contract platform 180, by service availability monitor 172, etc.). Once the node receives the data, it can propagate the data to other participating nodes of the distributed ledger network 120. The other participating nodes can add the data to their copy of the distributed ledger.

Nodes 202, 204 and/or 206 can validate a new block that is added to the distributed ledger network 120 by applying an operation to data of the block. The operation can involve solving a computationally difficult problem that can be verified easily (e.g., using minimal computing resources). In some embodiments, the operation can be a hash operation. In an illustrative example, each node of distributed ledger network 120 can execute instructions (e.g., via one or more processing devices of a local computing system of the node) to attempt to compute a hash value for a respective block 208 of the node using a cryptographic hash function (e.g., a secure hash algorithm (SHA)-256 function, etc.). An input to the hash function can include data associated with the block 208, in some embodiments and an output of the hash function can include hash value that represents the data of the block 208. Nodes 202, 204, 206 can build blocks 208 that include a reference (e.g., a data pointer) to the hash value of the previously block 208 of the distributed ledger. As such, blocks 208 of the distributed ledger are explicitly ordered by reference to the previous blocks' hash value, which reflects the content of that previous block. In an illustrative example, block 208B is explicitly ordered by reference to the hash value of block 208A, block 208C is explicitly ordered by reference to the hash value of block 208B, block 208D is explicitly ordered by reference to the hash value of block 208C, and so forth.

It should be noted that although embodiments of the present disclosure describe distributed ledger network 120 as a blockchain, distributed ledger network 120 can include other types of distributed ledgers, in accordance with embodiments of the present disclosure. It should be further noted that although FIG. 2 depicts three nodes (e.g., nodes 202, 204, and 206) of distributed ledger network 120, distributed ledger network 120 can include any number of nodes. In addition, although FIG. 2 depicts node 202 as including four blocks (e.g., blocks 208A, 208B, 208C, and 208D), nodes 202, 204, and/or 206 can include any number of blocks. Further, any embodiments described respect to node 202 above can be applied to any other node (e.g., node 204, 206, etc.) of distributed ledger network 120.

Figure 4:
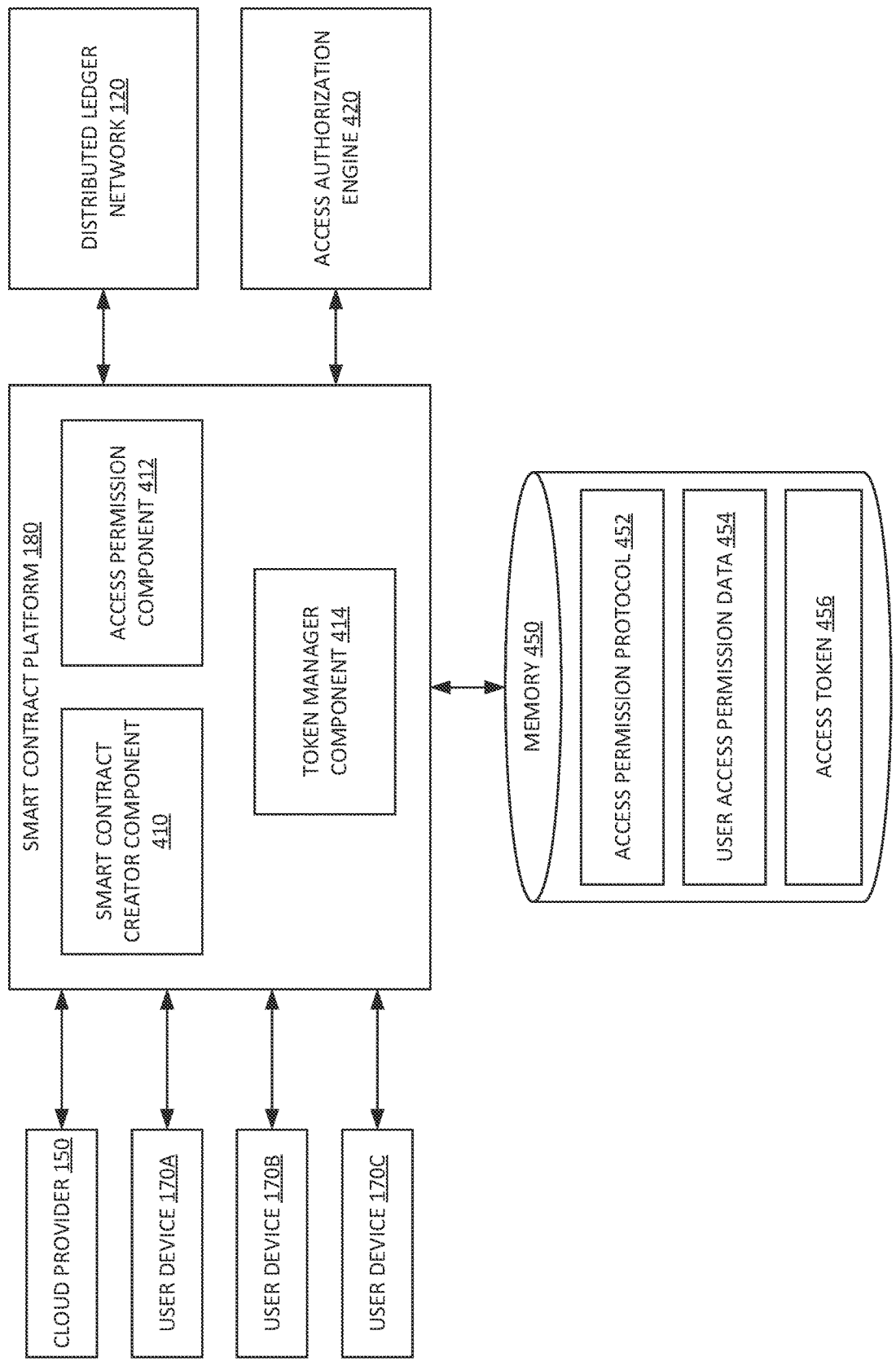
FIG. 4 depicts an example smart contract platform, in accordance with embodiments of the present disclosure.

FIG. 3 is a flow diagram illustrating an example method 300 for managing service level agreement breaches using distributed ledgers, in accordance with embodiments of the present disclosure. Method 300 can be performed by one or more components of smart contract platform 180, as described herein. For example, one or more operations of method 300 can be performed by smart contract creator component 410, access permission component 412, and/or token manager component 414 of smart contract platform 180, as illustrated in FIG. 4. Method 300 can be performed by processing logic that can comprise hardware (circuitry, dedicated logic, etc.), software (e.g., software executed by a general purpose computer system or a dedicated machine), or a combination of both. Method 300 and each of its individual functions, routines, subroutines, or operations can be performed by one or more processors of the computer device executing the method. In certain implementations, method 300 can each be performed by a single processing thread. Alternatively, method 300 can be performed by two or more processing threads, each thread executing one or more individual functions, routines, subroutines, or operations of the method.

At block 310, processing logic identifies an access control list that, for a specified data item, defines, for each of a set of access levels, one or more entities (e.g., stakeholders) that are to collectively authorize access to the data item according to a respective access level. As described above, the access control list can correspond to an access permission protocol of a data access policy between a cloud provider 150 and a user of services and/or resources provided by the cloud provider 150. The data of the access permission protocol can be application data (e.g., of an application of the user that is hosted using the cloud services and/or resources), in accordance with previously described embodiments. The set of users can include one or more stakeholders, as described above.

FIG. 4 depicts an example smart contract platform 180, in accordance with embodiments of the present disclosure. As illustrated in FIG. 4, smart contract platform 180 can be connected to a cloud provider 150, one or more user devices 170, a distributed ledger network 120, and/or an access authorization engine 420 (e.g., via network 102), as described with respect to FIG. 1. Smart contract platform 180 can be connected to or can otherwise have access to memory 450, in some embodiments. Memory 450 can include memory resources that are managed or otherwise accessible to cloud provider 150, user devices 170, smart contract platform 180, and/or access authorization engine 420. In other or similar embodiments, memory 450 can reside at data store 130.

For purposes of explanation and illustration only, user device 170A refers to a user device associated with a user of services and/or resources provided by cloud provider 150, user device 170B refers to a user device associated with a representative of cloud provider 150, and user device 170C refers to a user device associated with a stakeholder (e.g., a user or entity that is to provide authorization for an advanced level of access, as described herein. It should be noted that although FIG. 4 illustrates one of user device 170A, user device 170B, and user device 170C, embodiments described with respect to FIG. 4 can be applied to multiple of user device 170A, user device 170B, and user device 170C.

In some embodiments, one or more of cloud provider 150 and/or user device 170A can provide the access permission protocol to smart contract platform 180 (e.g., via network 102). Smart contract platform 180 can store the access permission protocol at memory 450 as access permission protocol 452, in some embodiments. In other or similar embodiments, access permission protocol 452 can be stored at memory 450 (e.g., by cloud provider 150, by user device 170A, etc.). Smart contract platform 180 can access the access permission protocol 452 at memory 450. In some embodiments, smart contract platform 180 can access the access permission protocol 452 in response to a request (e.g., from cloud provider 150, from user device 170A, etc.) to translate one or more terms or conditions of access permission protocol 452 into a smart contract.

Referring back to FIG. 3, at block 312, process logic translates the access permission protocol into a sequence of instructions implementing a smart contract. Smart contract creator component 410 (also referred to herein as "smart contract creator 410") of smart contract platform 180 can be configured to translate one or more terms or instructions of access permission protocol 452 into the smart contract. In some embodiments, smart content creator 410 can parse through access permission protocol 452 to identify data that corresponds to terms or conditions relating to providing an advanced level of access to user devices 170B in response to exceptional circumstances. In response to identifying such data, smart contract creator 410 can generate a sequence of instructions associated with providing the advanced level of access to user devices 170B, in some embodiments. In an illustrative example, smart contract creator 410 can identify one or more terms or conditions of access permission protocol 452 that indicate that a user device 170B that is normally not permitted to access the application data according to a write and read access level if errors meeting or satisfying a threshold severity level are detected for the application running via the resources and/or services. The terms or conditions can further indicate set of stakeholders (e.g., the user, another representative of cloud provider 150 having a managerial role, etc.) that are to provide authorization for the user device 170B to access the data according to the write and read access level. In some embodiments, the terms or conditions can also indicate that the user device 170B is to be provided with a read-only level access if a subset of the set of stakeholders (e.g., the user) provides authorization for the client device 170B. The terms or conditions can also indicate that if the remaining stakeholders (e.g., the representative of cloud provide 150 having a managerial role) provide authorization within a particular time period, the user device 170B is to be provided with the write and read level access (e.g., without obtaining authorization from the user a second time).

In response to identifying the terms or conditions of access permission protocol 452 that are to be translated into the sequence of instructions, smart contractor creator component 410 can translate the identified terms or conditions into the sequence of instructions. Smart contract creator 410 can translate the identified terms or conditions into the sequence of instructions by generating one or more instructions that correspond to the logic of the identified terms or conditions of the access permission protocol 452. In accordance with the previously illustrative example, smart contract creator 410 can translate the identified terms into a sequence of instructions, such as the following:

```
accesslevel_1 = 0;      //corresponding to no access
accesslevel_2 = 1;      //corresponding to read-only access
accesslevel_3 = 2;      //corresponding to write and read
                          access
while UD170B_accesslevel == 0 {
  if number_errors >= error_threshold {
    if stakeholder_vote > write_access_threshold {
      UD170B_accesslevel == 2;
    }
    else if stakeholder_vote > read_access_threshold {
      UD170B_accesslevel == 1;
    }
  }
  else {
    UD170B_access_level = 0
  }
}
```

It should be noted that smart contract creator 410 can translate the identified terms into a sequence including other instructions, in accordance with embodiments of the present disclosure. For example, the sequence of instructions can include instructions corresponding to a time period that user device 170B is enabled to access the application data according to the advanced access level (e.g., read-only access level, write and read access level, etc.). In another example, the sequence of instructions can include instructions relating to conditions for extending the time period, as described above. The sequence of instructions generated by smart contract creator 410 can correspond to a smart contract, in accordance with previously described embodiments.

In accordance with examples and embodiments described herein, the smart contract generated by smart contract creator 410 can transmit requests to at least one of one or more entities (e.g., stakeholders) for authorization to allow a requesting entity to access data. Based on responses to the transmitted requests, the smart contract can generate one or more tokens that enable the requesting entity to access the data per the number of stakeholders that authorized the access, per the request.

Referring back to FIG. 3, at block 314, processing logic provides the sequence of instructions to one or more nodes of a distributed ledger network. In some embodiments, smart contract platform 180 can designate node 202 as a node for executing the sequence of instructions corresponding to the one or more terms of the SLA. Smart contract platform 180 can designate node 202 as a node for executing the sequence of instructions by determining one or more resources of distributed ledger network 120 that are available to execute instructions of the smart contract (e.g., a node that is not already designated for executing other instructions of the smart contract or of another smart contract) and assigning the node to execute the sequence of instructions. In some embodiments, smart contract platform 180 can store an indication of the designation at memory 450 (not shown). Smart contract platform 180 can then transmit the sequence of instructions to smart contract platform 180 to node 202. For purposes of explanation and illustration only, embodiments of the present disclosure describe smart contract platform 180 providing the sequence of instructions to node 202, described with respect to FIG. 2, and/or blockchain client 122A, described with respect to FIG. 1. However, smart contract platform 180 can provide the sequence of instructions to any of nodes 202, 204 and/or 206, and/or blockchain clients 122A and/or 122B, in accordance with embodiments of the present disclosure. In response to receiving the sequence of instructions, node 202 can store the sequence of instructions at a local memory associated with one or more computing systems running node 202, as described above. Node 202, or another node of distributed ledger network 120 (e.g., node 204, node 206, etc.) can be configured to execute the sequence of instructions to provide user device 170B with an advanced level of access to the application data, in accordance with embodiments described herein.

As indicated above, a circumstance or event can occur as cloud provider 150 provides user device 170A with access to cloud-based networking services and/or resources to host a software application. For example, a problem can arise with respect to the provided services and/or resources that can only be resolved if representatives of cloud provider 150 access application data. In another example, a government entity can request (e.g., via a subpoena) access to application data associated with user device 170A. In response to such circumstances one or more entities of system architecture 100 can request that a representative associated with cloud provider 150 be temporarily able to access application data according to an advanced access level (e.g., in view of the access permission protocol and/or the break glass protocol of the cloud provider and the user of the services and/or resources). In some embodiments, user device 170A and/or user device 170B can transmit a request to provide user device 170B with the advanced level of access. In other or similar embodiments, one or more components of cloud provider 150 (e.g., other than user device 170B) can transmit the request.

In some embodiments, the request can be received by smart contract platform 180. In response to receiving the request, access permission component 412 of smart contract platform 180 can transmit data associated with the user device 170B and/or data associated with the circumstances surrounding the request for the advanced level of access to a node (e.g., node 202, node 204, node 206, etc.) of distributed ledger network 120. Data associated with the user device 170B can include a current access level associated with user device 170B, a current role associated with user device 170B, and so forth. Data associated with the circumstances surrounding the request for the advanced level of access include an indication of a type of event that is triggering the request, an indication of a severity of the event, and so forth. Data associated with the user device 170B and/or the circumstances surrounding the request for the advanced level of access can be stored at memory 450 as user access permission data 454, in some embodiments. In additional or alternative embodiments, the request can be received by a node of distributed ledger network 120. In such embodiments, the node (e.g., node 202, etc.) can obtain the user access permission data 454 by requesting the data 454 from smart contract platform 180 and/or by accessing a region of memory 450 that stores the data 454.

Node 202 (or another node of distributed ledger network 120) can execute the sequence of instructions corresponding to the smart contract, as described herein. In some embodiments, node 202 can identify, by executing one or more of the sequence of instructions, a set of users (e.g., stakeholders) that are to provide authorization for user device 170B to access application data according to the requested level of access (e.g., write and read access). Node 202 can identify one or more users devices associated with each of the set of users (e.g., user devices 170C, as described above) and can transmit a request for authorization to provide user device 170B with the requested access. In accordance with at least one previous illustrative example, node 202 can identify a user device 170C associated with a user of the contracted services and/or resources and a user device 170C associated with a representative of cloud provider 150 having a managerial role as included in the set of users and can transmit the request to such user devices 170C.

Node 202 (or another node of distributed leger network 120) can receive a response to the request sent to the one or more of user devices 170C, in some embodiments. In some embodiments, the response can indicate whether a stakeholder associated with a respective user device 170C has provided authorization. Node 202 can generate a token to enable user device 170B to access the application data according to the requested access level based on the authorizations received from user devices 170C. As indicated above, a token can include a cryptographic key or a password that is unique to the request to access the application data according to the requested level of access. In accordance with at least one previous illustrative example, in response to determining that both a user device 170C associated with a user of the contracted services and/or resources and a user device 170C associated with a representative of cloud provider 150 having a managerial role have provided authorization to provide user device 170C with the write and read access level, node 202 can generate a first token that enables user device 170B to access the application data according to the write and read access level. In response to determining that only the user device 170C associated with the user of the contracted services and/or resources has provided the authorization, node 202 can generate a second token that enables user device 170B to access the application data according to the read-only access level, as described above.

Referring back to FIG. 3, at block 316, processing logic can, optionally, receive a token associated with accessing the data according to a particular access level in view of a set of users that has provided authorization for a user to access the data. In some embodiments, node 202 (or another node of distributed ledger network 120) can provide the generated token to smart contract platform 180 (e.g., via network 102). Smart contract platform 180 can store the token at memory 450 as access token 456, as illustrated in FIG. 4. In other or similar embodiments, node 202 (or another node of distributed ledger network 120) can store access token 456 at memory 450, in accordance with previously described embodiments.

At block 318, processing logic can, optionally, provide the token to the user device to enable the user to access the data according to the particular access level. Token manager component 414 can transmit access token 456 to user device 170B, in some embodiments. In some embodiments, the request for the advanced level of access can be to provide multiple user devices 170B with the advanced level of access. In such embodiments, token manger component 414 can determine one or more of user devices 170B that is to receive access token 456 and transmit access token 456 to such user devices 170B. In additional or alternative embodiments, node 202 (or another node of distributed network 120) can generate multiple distinct tokens that are unique to each user device 170B that is to be granted access to the application data, in accordance with the request. Token manager component 414 can obtain each of the multiple distinct tokens and can transmit each of the tokens to each respective user device 170B, as described above. In other or similar embodiments, the request for the advanced level of access can be to provide user devices 170B associated with a particular role with the advanced level of access. In such embodiments, token manager component 414 can determine which of user devices 170B are associated with such role and can transmit access token 456 to the determined user devices 170B. In yet additional or alternative embodiments, node 202 (or another node of distributed ledger network 120) can transmit access token(s) 456 directly to user device(s) 170B (e.g., via network 102).

In some embodiments, token manager component 414 and/or node 202 (or another node of distributed ledger network 120) can provide access token 456 to access authorization engine 420. Access authorization engine 420 can be managed and/or maintained by cloud provider 150, one or more of user devices 170, smart contract platform 180, and/or distributed ledger network 120, in some embodiments. As described above, access authorization engine 420 can be connected to one or more of the services and/or resources provided to the user by cloud provider 150 and can be configured to enable user device 170B to access application data according to a respective access level. In some embodiments, token manager component 414 and/or node 202 can transmit access token 456 to access authorization engine 420 (e.g., via network 102). In other or similar embodiments, access authorization engine 420 can access token 456 via memory 450, as described above.

User device 170B can provide access token 456 to access authorization engine 420 (e.g., in a request to access the application data according to the authorized level of access). In response to receiving access token 456 from user device 170B, access authorization engine 420 can compare the provided token to the token received from token manager component 414 and/or node 202 (or another node) of distributed ledger network 120. In response to determining that the provided token corresponds to (e.g., matches or substantially matches) the received token, access authorization engine 420 can provide user device 170B with access to the application data according to the authorized level of access. Access authorization engine 420 can provide the access to user device 170B by updating (or requesting that another entity of system 100 update) access settings associated with user device 170B to enable device 170B to access the data according to the authorized level of access. In response to determining that the provided token does not correspond to the received token, access authorization engine 420 may deny access to the application data according to the authorized level of access. In such embodiments, access authorization engine 420 can transmit a notification of the request and subsequent denial to one or more of user device 170B, one or more nodes of distributed ledger network 120, smart contract platform 180, user device 170A, user device 170C, or cloud provider 150.

It should be noted that in additional or alternative embodiments, token manager component 414 and/or node 202 (or another node) may not provide user device 170B and/or access authorization engine 420 with an access token 456 to provide user device 170B with access to the application data. In some embodiments, smart contract platform 180 and/or node 202 can provide access authorization engine 420 with an identifier associated with user device 170B and a level of access to which user device 170B is authorized. User device 170B can transmit a request to access authorization engine 420 to access the application data according to the authorized level of access and access authorization engine 420 can provide the requested access in response to verifying the identifier associated with user device 170B.

As described above, in some embodiments, smart contract platform 180 and/or node 202 (or another node of distributed ledger network 120) can provide instructions associated with a time period that the user device 170B is authorized to access the application data according to the advanced level of access (e.g., in accordance with the access permission protocol). In some embodiments, the instructions can be transmitted directly to access authorization engine 420 (e.g., via network 102). In other or similar embodiments, the instructions can be encoded in access token 456. Access authorization engine 420 can provide user device 170B with the authorized access for the time period, in accordance with the instructions. In some embodiments, the event that triggered the advanced level of access may still be present at the end of the instructed time period. In some embodiments, the instructions provided to access authorization engine 420 can indicate that the access is authorized for another time period in the event that the event is not resolved. Access authorization engine 420 can determine whether the event is resolved based on a notification from user device 170B, user device 170A, cloud provider 150, smart contract platform 180, and/or one or more nodes of distributed ledger network 120, in some embodiments. In response to detecting that the event is not resolved at the end of the instructed time period, authorization engine 420 can extend the amount of time that user device 170B can access the application data according to the advanced access level to correspond to the additional authorized time period.

In other or similar embodiments, in response to detecting that the event is not resolved at the end of the instructed time period, access authorization engine 420 can transmit a notification to smart contract platform 180 and/or distributed ledger network 120 indicating that the event is not yet resolved. One or more nodes of distributed ledger network 120 can generate and transmit an updated token to user device 170B and/or access authorization engine 420 to enable user device 170B to continue to access the application data according to the authorized access level, as described above. In yet other or similar embodiments, one or more nodes of distributed ledger network 120 can detect that the event is not resolved at the end of the time period and can generate and transmit an updated token to user device 170B and/or access authorization engine 420 (e.g., without a request from other entities of system architecture 100).

In some embodiments, access authorization engine 420 can detect that the event is resolved prior to the end of the instructed time period (and/or an extended time period, as described above). In such embodiments, access authorization engine 420 can deny access to user device 170B to the application data according to the advanced level of access and can permit access to user device 170B to application data according to a normal level of access (e.g., as provided by eh data access policy). In some embodiments, access authorization engine 420 can transmit a notification (e.g., to distributed ledger network 120, smart contract platform 180, cloud provider 150, user devices 170, etc.) indicating that the event is resolved and/or access by the user device 170B according to the advanced level of access is revoked.

In some embodiments, access authorization engine 420 can monitor an activity of user device 170B while user device 170B is accessing the application data according to the advanced level of access. For example, if user device 170B is provided with write and read access to the application data, access authorization engine 420 can track portions of data that are read, written, and/or edited by user device 170B. Access authorization engine 420 can transmit data associated with the monitored activity of user device 170B to smart contract platform 180 and/or one or more nodes of distributed ledger network 120 (e.g., via network 102). Node 202 (or another node of distributed ledger network 120) can store the activity data at a local memory associated with the computing system supporting node 202 (or another node of distributed ledger network 120). In some embodiments, cloud provider 150, user device 170A, and/or user device 170C may transmit a request to smart contract platform 180 and/or a node of distributed ledger network 120 for a report of the activity data. Node 202 (or another node) can generate a report and provide the report in response to the request. In other or similar embodiments, access authorization engine 420 can provide the activity data to smart contract platform 180. Smart contract platform 180 can store the activity data (or a report of the activity data) at memory 450, as described above. In some embodiments, smart contract platform 180 can provide a report of the activity data to cloud provider 150, user device 170A, and/or user device 170C (e.g., in response to a request).

In accordance with at least one illustrative example, user device 170B, which is associated with a low level of access to application data (e.g., no access) can transmit a request (e.g., to smart contract platform 180 and/or distributed ledger network 120) to access the application data according to a high level of assess (e.g., write and read access). The access permission protocol 452 may provide that a set of users including a user of contracted services and/or resources and a representative of cloud provider 150 having a managerial role are to provide authorization for user device 170B to access the application data according to the high level of access. One or more nodes of distributed leger 120 may transmit a request to user devices 170C for the authorization, as described above. In some embodiments, the one or more nodes may receive authorization from a subset of the set of users. For instances, the one or more nodes may receive authorization from a user device 170C associated with the user of the contracted services and/or resources buy not from a user device 170C associated with the representative having the managerial role (e.g., within a threshold amount of time, etc.) In such instances, the one or more nodes can generate a token that enables user device 170B to access the application data according to a reduced level of access (e.g., read-only access). The reduced level of access can be a higher level of access than the low level of access and a lower level of access than the high level of access. User device 170B can use the token to access the application data according to the reduced level of access, in accordance with previously described embodiments. In some embodiments, the one or more nodes of distributed ledger network 120 can receive authorization from the user device 170C associated with the representative managerial role (e.g., within another threshold amount of time after the token is generated). The one or more nodes can generate an additional token that enables user device 170B to access the application data according to the high level of access. User device 170B can use the token to access the application data according to the high level of access, in accordance with previously described embodiments. In some embodiments, if the authorization is not received from the user device 170C associated with the representative managerial role within the other threshold amount of time after the initial token is generated, the one or more nodes can transmit another request for authorization to the user device 170C associated with the user of the contracted services and/or resources.

It should be noted that although examples and embodiments of the present disclosure provide that nodes of distributed ledger network 120 provide tokens for a reduced level of access when authorization is received from a subset of users, tokens for other types of access can be generated (e.g., in accordance with the access permission protocol), as described herein. For example, nodes of distributed ledger network 120 can generate tokens to provide user device 170B with access to application data for a shorter time period than would be provided if each of the set of user provides authorization. In another example, nodes of distributed ledger network 120 can generate tokens to provide user device 170B with access to different types of application data (e.g., less sensitive data) than would be accessible if each of the set of users provided authorization. Nodes of distributed ledger network 120 can generate updated tokens to provide the requested access once authorization is received from each of the set of users, as described above.

Figure 5:
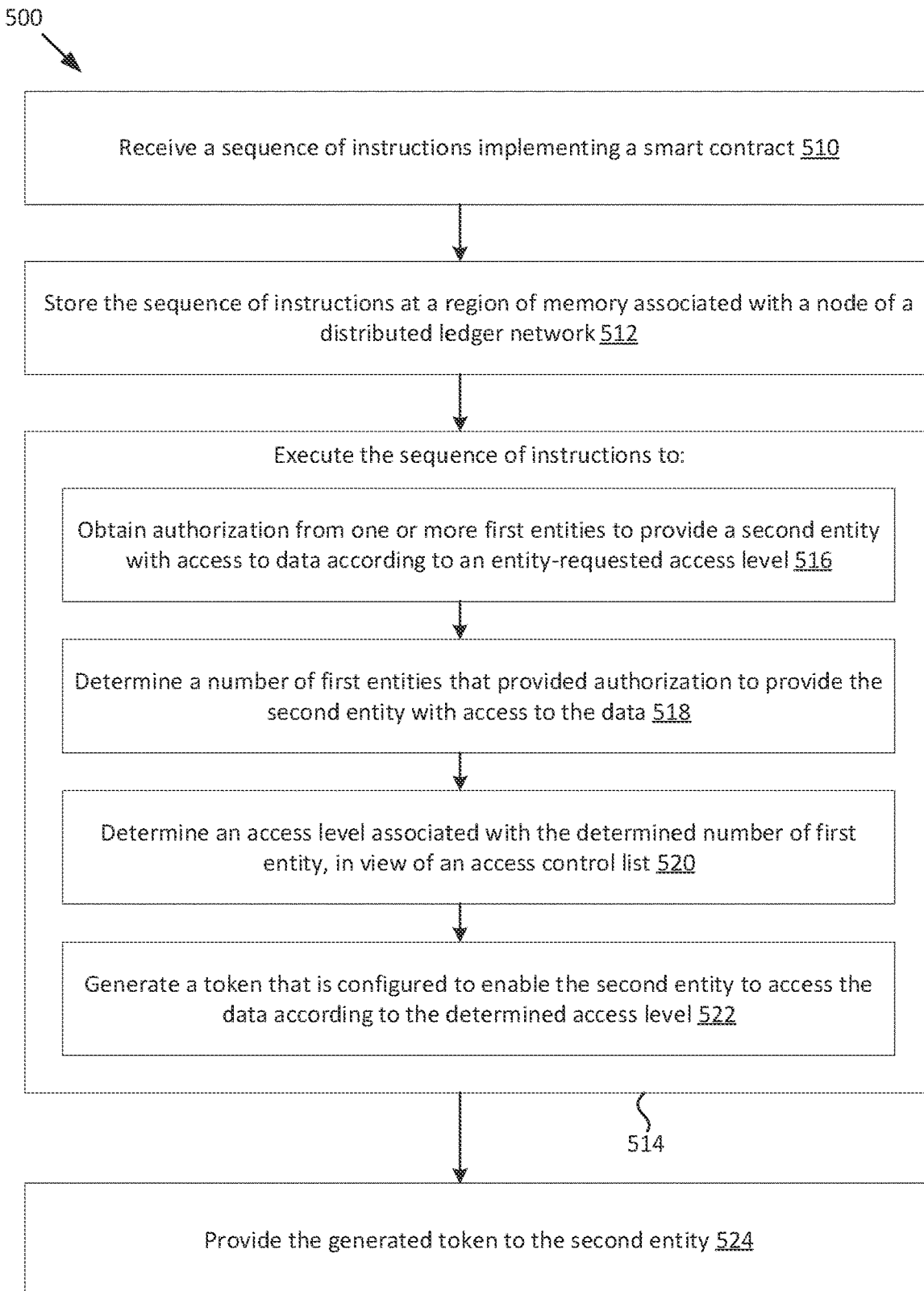
FIG. 5 is a flow diagram of another example method for managing access level permissions by a distributed ledger network, in accordance with embodiments of the present disclosure.

FIG. 5 is a flow diagram illustrating an example method 500 for managing service level agreement breaches using distributed ledgers, in accordance with embodiments of the present disclosure. Method 400 can be performed by one or more nodes (e.g., node 202, node 204, node 206, etc.) and/or one or more blockchain clients 122 of distributed ledger network 120, in accordance with previously described embodiments. Method 500 can be performed by processing logic that can include hardware (circuitry, dedicated logic, etc.), software (e.g., software executed by a general purpose computer system or a dedicated machine), or a combination of both. Method 500 and each of its individual functions, routines, subroutines, or operations can be performed by one or more processors of the computer device executing the method. In certain implementations, method 500 can each be performed by a single processing thread. Alternatively, method 500 can be performed by two or more processing threads, each thread executing one or more individual functions, routines, subroutines, or operations of the method.

At block 510, processing logic can receive a sequence of instructions implementing a smart contract. The sequence of instructions can be generated by smart contract platform 180, as described above. At block 512, processing logic can store the sequence of instructions at a region of memory associated with a node of a distributed ledger network, such as distributed ledger network 120, described above. At block 514, processing logic can execute instructions to perform operations associated with blocks 516. At block 516, processing logic can obtain authorization from one or more first entities (e.g., stakeholders) to provide a second entity with access to data according to a user-requested access level (e.g., an advanced access level). The one or more first entities can correspond to users of user device(s) 170C and the second entity can correspond to a user of user device 170B, as described with respect to FIG. 4. At block 518, processing logic can determine a number of first entities that provided authorization to provide the second entity with access to the data. At block 520, processing logic determines an access level associated with the determined number of first entities, in view of an access permission protocol (e.g., access permission protocol 452). At block 522, processing logic generates a token that is configured to enable the second entity to access the data according to the determined access level. At block 424, processing logic provides the generated token to the second entity. Processing logic can also or alternatively provide the generated token to smart contract platform 180 and/or access authorization engine 420, as described above.

Figure 6:
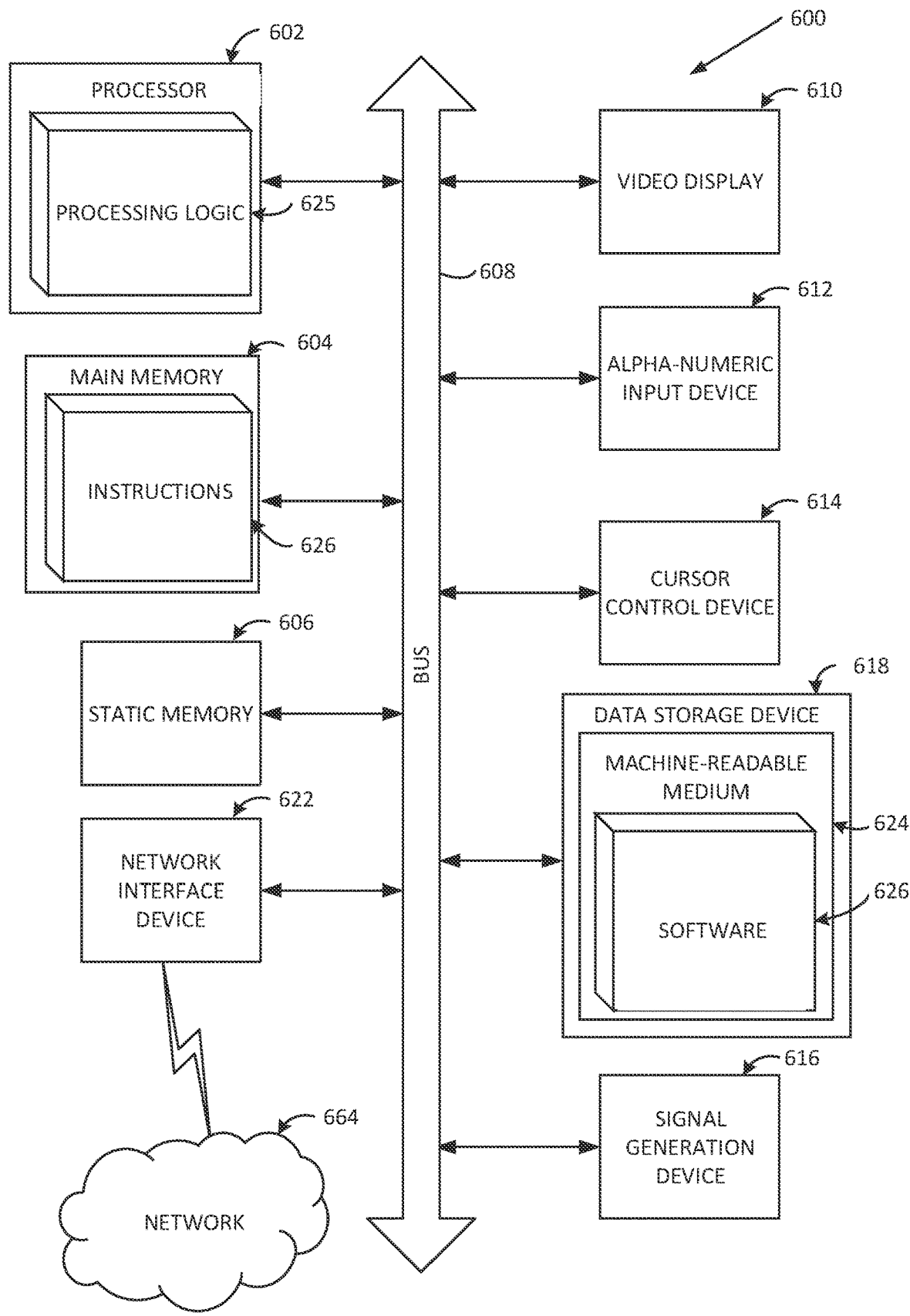
FIG. 6 is a block diagram illustrating a computing system in which implementations of the disclosure can be used.

FIG. 6 is a block diagram illustrating a computer system in which implementations of the disclosure can be used. In some implementations, the computer system 600 can support maintaining passwords for network-accessible service accounts, in accordance with previously described embodiments.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is to execute the instructions 626 for performing the operations and steps discussed herein.

The computer system 600 can further include a network interface device 622 communicably coupled to a network 625. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Instructions 626 can reside, completely or partially, within volatile memory 604 and/or within processing device 602 during execution thereof by computer system 600, hence, volatile memory 604 and processing device 602 can also constitute machine-readable storage medium 624. Data storage device 616 can include a computer-readable storage medium 624 (e.g., a non-transitory computer-readable storage medium) on which can store instructions 626 encoding any one or more of the methods or functions described herein, including instructions for implementing method 300 of FIG. 3 and method 500 of FIG. 5.

The non-transitory machine-readable storage medium 624 can also be used to store instructions 626 to support caching results of certain commands utilized for maintaining passwords for network-accessible service accounts described herein, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 300 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
identifying an access control list that, for a specified data item, defines, for each of a plurality of access levels, one or more entities that are to collectively authorize access to the specified data item according to a respective access level;
translating the access control list into a sequence of instructions implementing a smart contract, wherein the smart contract is to:
transmit requests to at least one of the one or more entities for authorization to allow a specified requesting entity to access the specified data item;
based on responses to the transmitted requests, generate: a first token that enables access to the specified data item according to a first access level of the plurality of access levels in response to the authorization provided by a first set of entities, and a second token that enables access to the specified data item according to a second access level of the plurality of access levels in response to the authorization provided by a second set of entities that is a subset of the first set of entities, wherein the first access level is a higher access level than the second access level; and
transmitting the sequence of instructions to one or more nodes of a distributed ledger network.

2. The method of claim 1, further comprising:
responsive to a request from a user device associated with a third access level of the plurality of access levels for the first token to access the specified data item according to the first access level, the third access level being a lower access level than the first access level and the second access level, receiving, from the one or more nodes, one or more of the first token or the second token; and
providing the one or more of the first token or the second token to the user device to enable the user device to access the specified data item according to at least one of the first access level or the second access level.

3. The method of claim 2, wherein providing the one or more of the first token or the second token to the user device comprises:
storing the one or more of the first token or the second token at a region of a memory that is accessible to the user device.

4. The method of claim 2, further comprising:
receiving, from the distributed ledger network, a request for additional information regarding a role associated with the user device; and
providing the additional information in response to the request for the additional information.

5. The method of claim 1, wherein translating the access control list into the sequence of instructions implementing the smart contract comprises:
identifying, in the access control list, one or more access conditions associated with providing access to the specified data item according to at least one of the first access level or the second access level; and
converting the one or more access conditions into one or more instructions of the sequence of instructions.

6. The method of claim 1, wherein the access control list further defines one or more events that warrant providing a respective entity with an increased level of access to the specified data item, a maximum level of access that can be provided to the respective entity, a length of a time period that the respective entity is to be permitted to access the specified data item according to the increased level of access, or one or more conditions associated with extending the time period.

7. The method of claim 1, wherein the distributed ledger network is a blockchain network.

8. A system comprising:
a memory; and
a processing device coupled to the memory, wherein the processing device to perform operations comprising:
identifying an access control list that, for a specified data item, defines, for each of a plurality of access levels, one or more entities that are to collectively authorize access to the specified data item according to a respective access level; translating the access control list into a sequence of instructions implementing a smart contract, wherein the smart contract is to:
transmit requests to at least one of the one or more entities for authorization to allow a specified requesting entity to access the specified data item;
based on responses to the transmitted requests, generate : a first token that enables access to the specified data item according to a first access level of the plurality of access levels in response to the authorization provided by a first set of entities, and a second token that enables access to the specified data item according to a second access level of the plurality of access levels in response to the authorization provided by a second set of entities that is a subset of the first set of entities, wherein the first access level is a higher access level than the second access level; and
transmitting the sequence of instructions to one or more nodes of a distributed ledger network.

9. The system of claim 8, wherein the operations further comprise:
responsive to a request from a user device associated with a third access level of the plurality of access levels for the first token to access the specified data item according to the first access level, the third access level being a lower access level than the first access level and the second access level, receiving, from the one or more nodes, one or more of the first token or the second token; and providing the one or more of the first token or the second token to the user device to enable the user device to access the specified data item according to at least one of the first access level or the second access level.

10. The system of claim 9, wherein providing the one or more of the first token or the second token to the user device comprises:

storing the one or more of the first token or the second token at a region of a second memory that is accessible to the user device.

11. The system of claim 9, wherein the operations further comprise:

receiving, from the distributed ledger network, a request for additional information regarding a role associated with the user device; and providing the additional information in response to the request for the additional information.

12. The system of claim 8, wherein translating the access control list into the sequence of instructions implementing the smart contract comprises:

identifying, in the access control list, one or more access conditions associated with providing access to the specified data item according to at least one of the first access level or the second access level; and converting the one or more access conditions into one or more instructions of the sequence of instructions.

13. The system of claim 8, wherein the access control list further defines one or more events that warrant providing a respective entity with an increased level of access to the specified data item, a maximum level of access that can be provided to the respective entity, a length of a time period that the respective entity is to be permitted to access the specified data item according to the increased level of access, or one or more conditions associated with extending the time period.

14. A non-transitory computer readable storage medium including instructions that, when executed by a processing device, cause the processing device to perform operations comprising:

identifying an access control list that, for a specified data item, defines, for each of a plurality of access levels, one or more entities that are to collectively authorize access to the specified data item according to a respective access level;

translating the access control list into a sequence of instructions implementing a smart contract, wherein the smart contract is to:

transmit requests to at least one of the one or more entities for authorization to allow a specified requesting entity to access the specified data item; based on responses to the transmitted requests, generate : a first token that enables access to the specified data item according to a first access level of the plurality of access levels in response to the authorization provided by a first set of entities, and a second token that enables access to the specified data item according to a second access level of the plurality of access levels in response to the authorization provided by a second set of entities that is a subset of the first set of entities, wherein the first access level is a higher access level than the second access level; and transmitting the sequence of instructions to one or more nodes of a distributed ledger network.

15. The non-transitory computer readable storage medium of claim 14, wherein the operations further comprise:

responsive to a request from a user device associated with a third access level of the plurality of access levels for the first token to access the specified data item according to the first access level, the third access level being a lower access level than the first access level and the second access level, receiving, from the one or more nodes, one or more of the first token or the second token; and providing the one or more of the first token or the second token to the user device to enable the user device to access the specified data item according to at least one of the first access level or the second access level.

16. The non-transitory computer readable storage medium of claim 15, wherein providing the one or more of the first token or the second token to the user device comprises:

storing the one or more of the first token or the second token at a region of a memory of that is accessible to the user device.

17. The non-transitory computer readable storage medium of claim 15, wherein the operations further comprise:

receiving, from the distributed ledger network, a request for additional information regarding a role associated with the user device; and providing the additional information in response to the request for the additional information.

18. The non-transitory computer readable storage medium of claim 14, wherein translating the access control list into the sequence of instructions implementing the smart contract comprises:

identifying, in the access control list, one or more access conditions associated with providing access to the specified data item according to at least one of the first access level or the second access level; and converting the one or more access conditions into one or more instructions of the sequence of instructions.

19. The non-transitory computer readable storage medium of claim 14, wherein the access control list further defines one or more events that warrant providing a respective entity with an increased level of access to the specified data item, a maximum level of access that can be provided to the respective entity, a length of a time period that the respective entity is to be permitted to access the specified data item according to the increased level of access, or one or more conditions associated with extending the time period.

20. The non-transitory computer readable storage medium of claim 14, wherein the distributed ledger network is a blockchain network.

* * * * *